United States Patent

Völker et al.

[15] 3,666,805

[45] May 30, 1972

[54] PREPARATION OF METHACRYLIC ACID

[72] Inventors: Theodor Völker; Erika Pichler, both of Freiburg, Switzerland

[73] Assignee: Lonza Ltd., Gampel (Canton of Valais), Basel, Switzerland

[22] Filed: Mar. 11, 1966

[21] Appl. No.: 533,441

[30] Foreign Application Priority Data

Mar. 12, 1965 Switzerland ..........................3495/65

[52] U.S. Cl. .......................................................260/531 R
[51] Int. Cl. ..........................................................C07c 57/04
[58] Field of Search ....................260/526 UN, 593 R, 531 R

[56] References Cited

UNITED STATES PATENTS

| 3,562,320 | 2/1971 | Woodward et al. | 260/531 |
|---|---|---|---|
| 2,811,545 | 10/1957 | Steadman | 260/531 |
| 2,393,737 | 1/1946 | Bortnick | 260/593 |
| 2,469,701 | 5/1949 | Redmon | 260/526 |

FOREIGN PATENTS OR APPLICATIONS

| 628,493 | 10/1961 | Canada | 260/526 |
|---|---|---|---|
| 1,195,295 | 6/1965 | Germany | 260/526 U |

OTHER PUBLICATIONS

Chemical Abstracts: Vol. 54 pg. 6572h citing Ohloff, Ann–627; 79– 95 (1959)
Chemical Abstracts: Vol. 54 pg. 11071a– 11071b citing Ohloff, Chem. Ber. 90, 1554– 1559 (1957)

*Primary Examiner*—Lorraine A. Weinberger
*Assistant Examiner*—R. S. Weissberg
*Attorney*—Christen & Sabol

[57] ABSTRACT

Methacrylic acid can be prepared by a novel process comprising heating α-hydroxyisobutyric acid in the presence of a compound of basic reaction at a temperature of about 160° to 340° C. in a reaction medium comprising an inert polar liquid having a boiling point above 200° C.

8 Claims, No Drawings

PREPARATION OF METHACRYLIC ACID

This invention relates to a process for the preparation of methacrylic acid.

It is known that $\alpha$-hydroxyisobutyric acid can be converted to methacrylic acid by splitting off water. Such dehydration process was commercially impractical because the $\alpha$-hydroxyisobutyric acid is a thermally unstable compound; it decomposes to a large extent on heating, and on distillation, the yield of methacrylic acid is only about 13 percent by weight, calculated on the weight of the starting material. The balance forms, in part, tetramethylglycolide, part decomposes to acetone, carbon monoxide, and water. The use of dehydrating agents such as sulfuric or phosphoric acid did not help; under such conditions, decomposition to acetone, carbon monoxide, water, acetaldehyde, and acetic acid took place.

We have found that $\alpha$-hydroxyisobutyric acid can be converted to methacrylic acid in much higher and commercially attractive yields by heating in the presence of a basic reacting compound in an inert polar liquid which has a boiling point above 200° C. The reaction temperature is 160° to 340° C. preferably 260° to 320° C.

Our new process is based on the discovery that the $\alpha$-hydroxyisobutyrate ion, due to its better stability, allows the thermal dehydration to the methacrylate ion. Said dehydration is accomplished by heating the free $\alpha$-hydroxyisobutyric acid in the presence of additives which allow formation of the $\alpha$-hydroxyisobutyrate ion (=dissociation) at the temperatures recited above. Additives which produce said dissociation, are compounds having a basic reaction such as oxides, hydroxides, carbonates, carboxylates and alcoholates of alkali metals and alkaline earth metals; also amines, phosphines, particularly those with tertiary nitrogen and phosphorus atoms, e.g., quinoline, isoquinoline, trioctylamine, triphenylphosphine, and others. We prefer to use sodium compounds of alkaline reaction.

We assume the reaction to proceed as follows

In a first step, the free $\alpha$-hydroxyisobutyric acid is quickly stabilized by dissociation to the ion I.

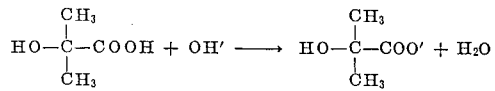

In a second step, the ion I is dehydrated to the methacrylate ion II.

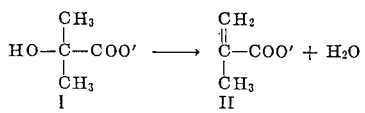

In a third step, the ion II is liberated as methacrylic acid by further reaction with $\alpha$-hydroxyisobutyric acid.

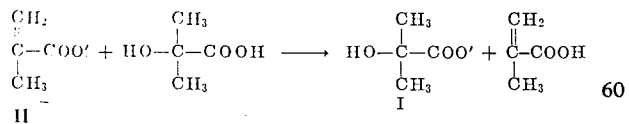

The reaction of said third step may be due to the difference in the dissociation constants of the $\alpha$-hydroxyisobutyric acid and the methacrylic acid.

The process can be carried out in various ways. For instance, the $\alpha$-hydroxyisobutyric acid may be simply heated to reaction temperature in the reaction medium with the compound of basic reaction, whereby the formed methacrylic acid distills out of the reaction vessel.

Suitable inert polar liquids are those which contain, in addition to C and H atoms, hetero atoms like O, S, N, and which have a boiling point above 200° C., preferably above 250° C. Such liquids are, for instance, polyethylene oxide derivatives having the recited boiling point, such as triethyleneglycol dibutylether, tetraethyleneglycol dimethylether, pentaethyleneglycol dibutylether, also quinoline, acridine, and similar compounds.

The $\alpha$-hydroxyisobutyric acid is charged in the molten state, or preferably as solution, e.g. alcoholic solution, into the reaction medium which is heated at reaction temperature and contains compounds having a basic reaction.

The formed methacrylic acid and, if present, the solvent for the $\alpha$-hydroxyisobutyric acid, are continuously distilled out of the reaction space to prevent interference with the course of the reaction. In order to assist the removal of the formed methacrylic acid, a carrier gas, e.g. an inert gas, may be employed additionally.

The concentration of the basic compound in the reaction medium depends on whether the operation is carried out as a batch process or continuously. In a batch process, we prefer to use 0.02 to 0.1 mole of the basic compound per mole of $\alpha$-hydroxyisobutyric acid, unless the polar liquid is identical with the basic compound. In a continuous process, the amount of basic compound is a function of the rate of flow of the $\alpha$-hydroxyisobutyric acid. For instance, at a rate of flow of 1 mole of $\alpha$-hydroxyisobutyric acid per hour, we will employ 0.05 to 0.5 moles of the basic compound.

An addition of inhibitors such as induline, pyrocatechol, hydroquinone, hydroquinone monomethylether, methylene blue, is useful, in the batch process as well as in continuous operation, to prevent polymerization of the methacrylic acid.

As additive promoting the dissociation, we may also use a salt, particularly the sodium salt, of the $\alpha$-hydroxyisobutyric acid.

The following examples are given to illustrate the invention.

EXAMPLE 1

Batch Process in Presence of an Inorganic Basic Compound 26.0 g of $\alpha$-hydroxyisobutyric acid, 0.4 g of sodium hydroxide, and 60 g of pentaethyleneglycol dibutylether were charged into a 250 ml three-neck flask equipped with magnet stirrer, thermometer, and reflux condenser, and were slowly heated therein with stirring. As soon as the temperature in the flask had risen to about 160° C., a distillate distilled over whose temperature was soon 160° C. and more. Heating was continued to a reaction temperature of 320° C.

In the distillate, the proportion of methacrylic acid was determined by the acid and bromine numbers. About 90.2 percent of the $\alpha$-hydroxyisobutyric acid had been dehydrated to methacrylic acid.

EXAMPLE 2

Batch Process in Presence of an Organic Basic Compound

In the apparatus described in Example 1, there were heated 26.0 g of $\alpha$-hydroxyisobutyric acid and 26.0 g of quinoline, which acted as polar liquid as well as basic compound. The reaction product, which distilled over at a bath temperature of 200°–227° C., contained 10.0 g of methacrylic acid, corresponding to a yield of 46.5 percent of theory.

EXAMPLE 3

Continuous Operation Employing a High Boiling Inert and Polar Solvent as Reaction Medium a. in absence
b. in presence of dissociation promoting addition.

3a 90 g of tetraethyleneglycol dimethylether and 1 g of pyrocatechol as polymerization inhibitor were placed into a three-neck flask equipped with a dropping funnel, a thermometer, a Claisen attachment, and a magnet stirrer, and heated at about 260° C. 42.0 g of a 34.3 percent methanolic $\alpha$-hydroxyisobutyric acid were slowly charged into said reaction medium with stirring. The reaction product condensed at a Liebig cooler and an inclined spherical cooler contained, in addition to undesirable fission products of the α-hydroxyisobutyric acid (much acetone) 3.1 g of methacrylic acid in methanolic solution, corresponding to a yield of 26.0 percent, calculated on the starting α-hydroxyisobutyric acid.

3b

The reaction medium consisted of 90.0 g of tetraethyleneglycol dimethylether, 1.0 g of sodium hydroxide, and 1.0 g of pyrocatechol as polymerization inhibitor, heated at about 260° C. As described in Example 3a, various amounts of α-hydroxyisobutyric acid in form of 30–35 percent solutions in methanol were slowly added (0.1 mole/hour of α-hydroxyisobutyric acid), one after the other. Between the runs, listed in the following table, the reaction medium was cooled, and then, without further additions, used for the next run. The content of methacrylic acid was determined separately in the reaction products of the individual tests by means of the acid and bromine numbers. The reaction products did not contain any detectable amounts of decomposition products (acetone).

The yields of the test series show that tetraethyleneglycol dimethylether is very suitable as a high boiling polar reaction medium for the continuous dehydration of the α-hydroxyisobutyric acid by way of its anion. The activity of the reaction medium did not decrease even after repeated use.

| Test No. | α-hydroxyisobutyric acid moles | Reaction temperature °C. | Distillation temperature °C. | Yield Methacrylic acid % |
|---|---|---|---|---|
| I | 0.191 | 225–264 | 73–122 | 86.3 |
| II | 0.157 | 250–262 | 91–110 | 94.5 |
| III | 0.117 | 256–266 | 74–161 | 100.0 |
| IV | 0.129 | 256–267 | 77–117 | 95.7 |

We claim:

1. A process for the preparation of methacrylic acid comprising heating α-hydroxyisobutyric acid in the presence of 0.02 to 0.5 mol of a basic compound per mol of said α-hydroxyisobutyric acid at a temperature of about 160° to 340° C. in a reaction medium consisting essentially of an inert polar liquid having a boiling point above 200° C., thereby obtaining methacrylic acid.

2. The process as claimed in claim 1 comprising charging the α-hydroxyisobutyric acid in the molten state into said reaction medium containing said basic compound.

3. The process as claimed in claim 1 comprising charging the α-hydroxyisobutyric acid in form of an alcoholic solution into said reaction medium containing said basic compound.

4. The process as claimed in claim 1 wherein said compound of basic reaction contains sodium ions.

5. The process as claimed in claim 1 including the step of distilling off continuously the formed methacrylic acid.

6. The process according to claim 1 wherein said basic compound is selected from the group consisting of alkali metal oxides, alkaline earth oxides, alkali metal hydroxides, alkaline earth hydroxides, alkali metal carbonates, alkaline earth carbonates, alkali metal carboxylates, alkaline earth carboxylates, alkali metal alcoholates, alkaline earth alcoholates, amines and phosphines.

7. The process according to claim 1 wherein said inert polar liquid is selected from the group consisting of triethyleneglycol dibutylether, tetraethyleneglycol dimethylether, pentaethyleneglycol dibutylether, quinoline and acridine.

8. The process according to claim 6 wherein said inert polar liquid is selected from the group consisting of triethyleneglycol dibutylether, tetraethyleneglycol dimethylether, pentaethyleneglycol dibutylether, quinoline and acridine.

* * * * *